United States Patent
Yasuda

(10) Patent No.: US 11,903,372 B2
(45) Date of Patent: Feb. 20, 2024

(54) FISHING REEL AND FISHING TOOL MANAGEMENT SYSTEM

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/114,800

(22) Filed: Feb. 27, 2023

(65) Prior Publication Data

US 2023/0276779 A1    Sep. 7, 2023

Related U.S. Application Data

(63) Continuation of application No. 17/411,800, filed on Aug. 25, 2021, now Pat. No. 11,596,133.

(30) Foreign Application Priority Data

Aug. 27, 2020   (JP) ................................. 2020-143244

(51) Int. Cl.
*A01K 89/01*   (2006.01)
*A01K 89/015*   (2006.01)
*A01K 89/033*   (2006.01)

(52) U.S. Cl.
CPC ........ *A01K 89/0178* (2015.05); *A01K 89/033* (2013.01)

(58) Field of Classification Search
CPC .. A01K 89/0178; A01K 89/033; A01K 91/02; A01K 91/20
See application file for complete search history.

(56) References Cited

U.S. PATENT DOCUMENTS

| | | | |
|---|---|---|---|
| 4,261,528 A * | 4/1981 | McKinney | A01K 89/0102 116/307 |
| 4,697,758 A | 10/1987 | Hirose et al. | |
| 5,524,831 A | 6/1996 | Carlson | |
| 2004/0124297 A1 | 7/2004 | Steer | |

FOREIGN PATENT DOCUMENTS

| | | | |
|---|---|---|---|
| CN | 102613149 A | | 8/2012 |
| JP | H05-069614 A | | 9/1993 |
| JP | 2017216938 A | * | 12/2017 |
| JP | 2021145654 A | | 9/2021 |
| KR | 20200050347 A | | 5/2020 |
| RU | 2507740 C2 | * | 2/2014 |

OTHER PUBLICATIONS

Office Action for related Chinese Application No. 202110967773.7; action dated Sep. 14, 2022; (18 pages).
Second Chinese Office Action dated Apr. 28, 2023, Chinese Application No. 202110967773.7, pp. 1-22.
Chinese Rejection Decision in connection with Chinese Patent Application No. 202110967773.7; action dated Sep. 7, 2023; (16 pages).

\* cited by examiner

*Primary Examiner* — Emmanuel M Marcelo
(74) *Attorney, Agent, or Firm* — Oliff PLC

(57) ABSTRACT

A fishing reel according to an embodiment of the present disclosure is configured to include a spool capable of winding a fishing line, an operation portion that winds the fishing line, a fishing line unwinding commencement detector that detects the commencement of the unwinding of the fishing line by the fishing reel, and an unwinding interval measuring portion that measures a time interval between the commencement of the unwinding of the fishing line and the commencement of the next unwinding of the fishing line.

7 Claims, 3 Drawing Sheets

FISHING REEL AND FISHING TOOL MANAGEMENT SYSTEM

CROSS-REFERENCE TO RELATED APPLICATIONS

This application is a U.S. Continuation application based on U.S. application Ser. No. 17/411,800 filed on Aug. 25, 2021 which claims priority under 35 U.S.C. § 119 to Japanese Patent Application No. 2020-143244 filed on Aug. 27, 2020, in the Japanese Intellectual Property Office, the entire contents of each hereby incorporated by reference.

FIELD

The present disclosure relates to a fishing reel capable of measuring and managing the time required to retrieve a rig and cast the rig again ("retrieving/casting time"), and a fishing tool management system equipped with said reel.

BACKGROUND

Conventionally, a fishing reel with a display (display unit or display portion) has been disclosed for improving convenience while fishing. Such a reel enables a user to grasp the state of the reel by displaying the length of an unwound fishing line and the winding speed.

As such a reel, Japanese Utility Model Application Publication No. H05-069614 ("Patent Literature 1") discloses, for example, a fishing reel having a line length measuring device that displays, on a display of a display device provided on a reel body, the measured values of the unwound or wound length of a fishing line wound on a spool rotatably mounted on the reel body, wherein a timer means for counting the waiting time of a rig in the water is equipped and a display that displays the time counted by the timer means is provided on said display device, and the display that displays the line length value measured by the line length measuring device and the display that displays the time counted by the timer means are arranged so that such displays can be checked at the same time from up above the reel body.

SUMMARY

Patent Literature 1 discloses a reel that makes it easier to recognize the remaining time before a residual amount of a ground bait runs out, by displaying the time elapsed from casting a rig into water; however, it is generally said that the ability to retrieve a rig and cast the rig again quickly is important in order to increase catch of fish. The retrieving/casting time here is the time required to retrieve a rig and cast the rig again.

However, conventional reels cannot actually measure and display the retrieving/casting time, a user in reality relies on his/her memory. The reel according to Patent Literature 1 only displays the time elapsed from casting a rig, and could not display the retrieving/casting time related to the skill level of fishermen.

The present disclosure has been made in view of the above circumstances, and the objective thereof is to provide a fishing reel capable of measuring or calculating the retrieving/casting time, or a fishing information management system equipped with said reel. Other purposes of the present disclosure will become apparent upon reference to this specification in its entirety.

A fishing reel according to an embodiment of the present disclosure is configured to include a spool capable of winding a fishing line, an operation portion (operation unit) that winds the fishing line, a fishing line unwinding commencement detector (fishing line unwinding commencement detecting unit or fishing line unwinding commencement detecting portion) that detects the commencement of the unwinding of the fishing line by the fishing reel, and an unwinding interval measuring portion (unwinding interval measuring unit) that measures a time interval between the commencement of the unwinding of the fishing line and the commencement of the next unwinding of the fishing line.

A fishing reel according to an embodiment of the present disclosure is configured to include a spool capable of winding a fishing line at one end of which a rig is attached, an operation portion that winds the fishing line, a fishing line unwinding commencement detector that detects the commencement of the unwinding of the fishing line by the fishing reel, a retrieval completion detector (retrieval completion detecting unit or retrieval completion detecting portion) that detects the retrieval of the rig, a retrieving/casting time measuring portion (retrieving/casting time measuring unit) that measures a time interval from the retrieval of the rig to the commencement of the next unwinding of a fishing line.

A fishing reel according to an embodiment of the present disclosure includes a display, wherein the display is configured to be capable of displaying at least one of a time interval between the commencement of the unwinding of the fishing line and the commencement of the next unwinding of the fishing line, or a time interval from the retrieval of the rig to the commencement of the next unwinding of the fishing line. Further, in a fishing reel according to an embodiment of the present disclosure, the display is configured to display at least one of a time interval between the commencement of the unwinding of the fishing line and the commencement of the next unwinding of the fishing line, or a time interval from the retrieval of the rig to the commencement of the next unwinding of the fishing line.

A fishing information management system according to an embodiment of the present disclosure is configured to include the fishing reel, a storage (storing unit or storing portion) that stores at least one of a time interval between the commencement of the unwinding of the fishing line and the commencement of the next unwinding of the fishing line, or a time interval from the retrieval of the rig to the commencement of the next unwinding of the fishing line, and a display that displays said information.

A fishing information management system according to an embodiment of the present disclosure is configured to include the fishing reel, a storage that stores a history of at least one of a time interval between the commencement of the unwinding of the fishing line and the commencement of the next unwinding of the fishing line, or a time interval from the retrieval of the rig to the commencement of the next unwinding of the fishing line, and a display that displays said history.

According to the above-described embodiment, it is possible to provide a fishing reel capable of measuring, displaying or managing the retrieving/casting time pertaining to the skill level of fishermen, and a fishing information management system equipped with said reel.

DETAILED DESCRIPTION

Figure 1A:
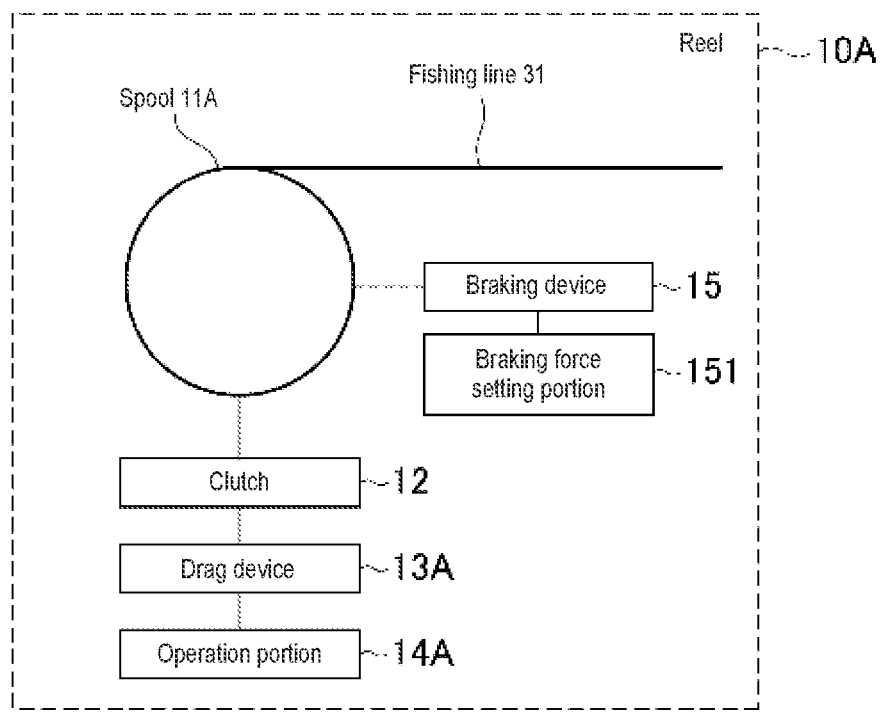
FIG. 1a is a diagram illustrating a fishing reel 10A according to an embodiment of the present disclosure.

Hereinafter, embodiments of a fishing reel and a fishing information management system according to the present disclosure will be described in detail with reference to the accompanying drawings. Components that are common in the plurality of drawings are denoted by the same reference numerals throughout the plurality of drawings. It should be noted that each of the drawings is not necessarily scaled for convenience of explanation.

Figure 1B:
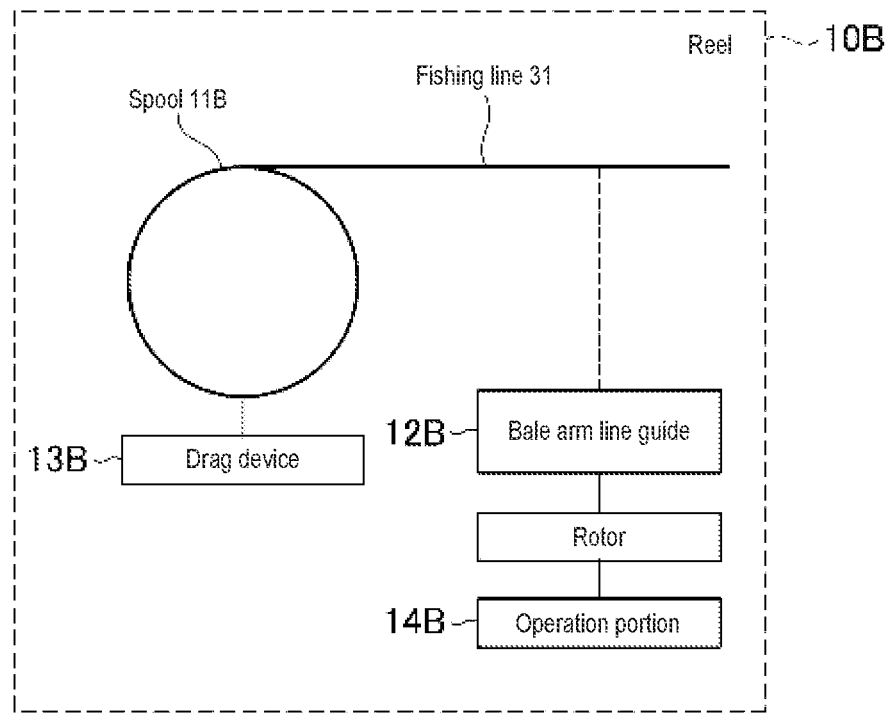
FIG. 1B is a diagram illustrating a fishing reel 10B according to an embodiment of the present disclosure.
Figure 2:
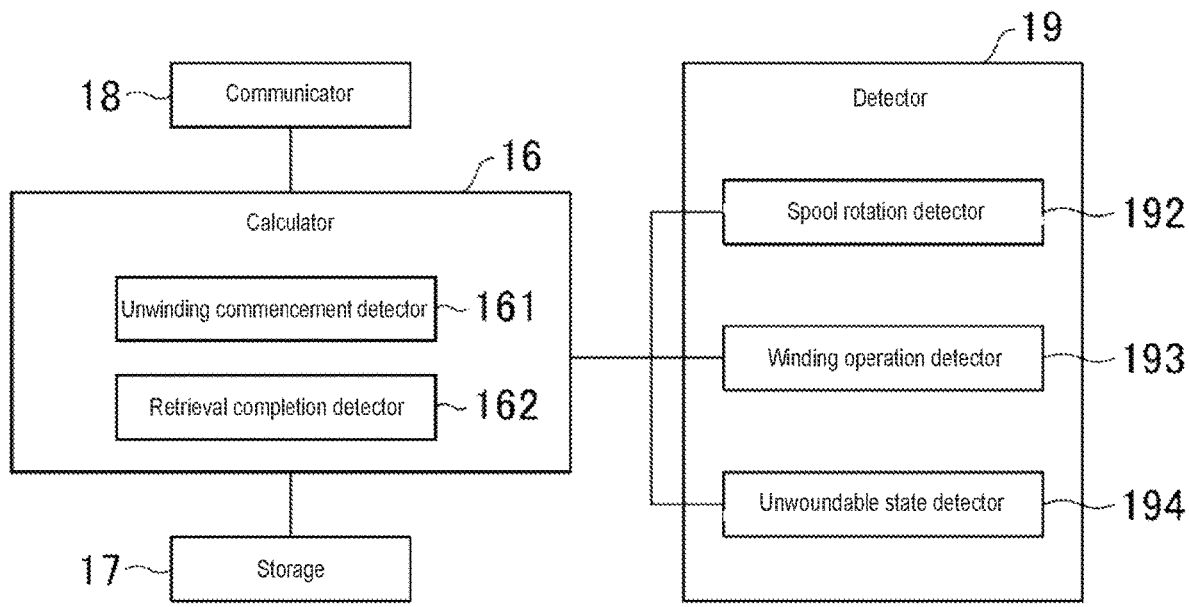
FIG. 2 is a diagram illustrating the fishing reel 10 and a fishing information management system 100 according to an embodiment of the present disclosure.

First, the fishing reel 10 and a fishing information management system according to an embodiment of the present disclosure will be described with reference to FIGS. 1a, 1b, and 2. FIG. 1 is a diagram illustrating a basic configuration of the fishing reel 10, in which FIG. 1a is a case where a double-bearing-type reel is used as the fishing reel 10, and FIG. 1b is a case where a spinning-type reel is used. First, a double-bearing fishing reel 10A will be described.

The illustrated spool 11A is capable of winding a fishing line 31, and can wind the fishing line 31 when it is rotated forward by an operating portion (operation unit) 14A. For a clutch 12, the connection/disconnection of the power transmission to/from the operating portion 14A can be selected. In connected status, the operating portion 14A can perform winding operation. In disconnected status, the spool 11A can be freely rotated forward and backward, which makes it possible to unwind the fishing line 31.

The illustrated drag device 13 can idle the spool 11 when a load equal to or greater than a set tension is applied to the fishing line 31. The operating portion 14A is configured as, for example, a handle, and transmits a user's rotation operation to the spool 11A through a transmission mechanism such as a gear, so that the spool 11A can be rotated forward. Incidentally, an operation portion 4 may be a combination of an operation member such as a lever, and a power source such as a motor.

The illustrated braking device 15 can generate a braking force on a spool. This makes it possible to suppress the occurrence of a backlash upon casting. The braking force can be set by a braking force setting portion (braking force setting unit) 151.

Next, a case where a spinning reel 10B is used as the fishing reel 10 will be described. A spool 11B is fixed to the reel body via a drag device 13B.

The illustrated drag device 13B can idle the spool 11 when a load equal to or greater than a set tension is applied to the fishing line 31. The fishing line 31 is guided to a line guide 12B and is wound on the spool 11B by the line guide 12B rotating around the spool 11.

The illustrated line guide 12B is held at the tip of a rotor rotatably supported with respect to the reel body, and the fishing line 31 can be made guidable or not by opening and closing a bale arm. When the bale arm is open, the line guide 12B becomes not woundable, and the fishing line 31 can be unwound. When the bale arm is closed, the line guide 12B becomes woundable, and the fishing line 31 cannot be unwound. The illustrated operation portion 14B is configured as, for example, a handle, and transmits a user's rotation operation to the rotor through a transmission mechanism such as a gear, so that the line guide 12B can be rotated forward.

Next, the general operations performed by a user while fishing and definitions of terms will be described. Generally, a user repeatedly casts and retrieves a rig, following the steps below, during fishing:

(1) operating the clutch 12 or a bale arm to enable the fishing line 31 to be unwound;

(2) casting out a rig swinging a fishing rod or dropping a rig due to the gravity of a weight to unwind the fishing line 31;

(3) enabling the fishing line 31 to be wound (not to be unwound) by following the step opposite to the one in (1) when the rig reaches a predetermined spot;

(4) waiting for a fish bite by means appropriate for a fish species or fishing method, such as operating an operating means 14 by, for example, letting the lure swim or remain as it is;

(5) operating the operating means 14 to wind the fishing line 31, and retrieving the rig when a fish is caught or a predetermined time has elapsed; and (6) collecting the fish caught, or replacing the bait and the lure as necessary when completing the winding-up, and starting the step in (1) again.

In the fishing reel 10 according to an embodiment of the present disclosure, the "retrieving/casting time" is defined as the time interval from the above (6) to the next (1). Further, the "unwinding interval" is defined as the time interval from the above (1) to the next (1).

Generally, the shorter the retrieving/casting time is, the better catch of fish will be. Since fish may be caught between (2) and (5) above, the larger the ratio of time between (2) and (5) to the total time of fishing is, the better the catch of fish will be. Since besides the section between (2) and (5), the most time consuming is the section between (6) and (1), the likelihood of catching fish becomes higher when the operations to be performed during this section are promptly handed. Skilled persons tend to require less time for the section between (6) and (1) and to catch more fish.

For some target fish species, the shorter the unwinding interval is, the better the catch of fish will be. For example, in lure fishing in which a rig is repeatedly cast, a rig can be cast over a wider area by shortening the unwinding interval and increasing the number of times of casting, which may lead to a higher possibility of catching more fish. Measuring and displaying the retrieving/casting time and the unwinding interval enables to obtain an index according to the skill level of fishermen.

Next, the configuration of the fishing reel 10 and the fishing information management system 100 according to an embodiment of the present disclosure will be described. FIG. 2 shows the configuration of the fishing reel 10 and the fishing information management system 100 according to an embodiment of the present disclosure. The fishing reel 10 has a detector (detecting unit or detecting portion) 19 that detects various operations by a user and the state of the reel. The detection results from the detector 19 are sent to a calculator (calculating unit or calculating portion) 16, and are displayed on a display (not illustrate) after arithmetic processing, or storage or temporary storage in a storage 17, as necessary.

The calculator 16, a display (not illustrated), and the storage 17 may all be provided on a fishing reel, or constitute part of a fishing information management system. More specifically, the display may be an external device such as a smartphone, a wearable terminal, a notebook computer, or a fishing finder, or may also be realized by providing an LCD or the like on a fishing reel or a fishing rod. When an external device is used, the fishing reel is provided with a communicator (communication unit or communication portion) using wireless or wired communications.

The detector 19 includes the followings. Note that some may be omitted because of restrictions on cost, size or the like. The detector 19 may be a spool rotation detector (spool rotation detecting unit or spool rotation detecting portion) 192, which detects the rotation of the spool 11. It can be realized by known means such as an incremental-type rotation sensor using a photo interrupter. A non-contact type rotation sensor is desirable to achieve a smooth rotation of the spool 11.

The detector 19 may be a winding operation detector (winding operation detecting unit or winding operation detecting portion) 193, which detects the rotation of an operation portion 14. It can be realized by attaching a rotation sensor to the operation portion 14, or a gear or the like that rotates in conjunction with the operation unit 14. The amount of idling by the drag device 13 can be calculated by taking the difference between the winding operation detector 193 and the spool rotation detector 192.

The detector 19 may also be an unwoundable state detector (unwoundable state detecting unit or unwoundable state detecting portion) 194, which detects whether or not the fishing line 31 is unwoundable from the fishing reel 10. In the exemplary double-bearing reel 10A described above, it can be realized by detecting the connection status of the clutch 12. A limit sensor or the like may be attached to part of the member on which the clutch operates. In the exemplary spinning reel 10B, it can be realized by detecting the opening/closing status of a bale arm. A limit sensor or the like may be attached to part of the member on which the bale arm operates.

Next, the measured values acquired by the detector 19 are sent to the calculator 16. The calculator 16 includes an unwinding commencement detector (unwinding commencement detecting unit or unwinding commencement detecting portion) 161 that detects the unwinding of a fishing line and a retrieval completion detector 162 that detects the completion of the retrieval of a fishing line. A method for detecting the commencement of the unwinding of a fishing line with the unwinding commencement detector 161 will be described.

In the case of the double-bearing fishing reel 10A, (1) is recognized when the unwoundable state detector 194 detects that the clutch is turned off from on. Thereafter, (2) is recognized when the spool rotation detector 192 detects that the spool 11A starts rotating.

Then, (3) is recognized when the unwoundable state detector 194 detects that the clutch is turned on from off. When the phenomena in (1) to (3) occur in succession, a fishing line is recognized to have been unwound. That point of time of each said phenomena is recorded.

Another method for detecting the commencement of the unwinding of a fishing line by the unwinding commencement detector 161 will be described. During the section between (6) and (1), a user needs to manually manipulate the tip of the fishing line; therefore, the length of the unwound fishing line is about the length of the fishing rod in use. On the other hand, during the sections between (2) and (3), (3) and (4), and (4) and (5), the length of the unwound fishing line is longer than the length of the fishing rod by several meters or more. Therefore, the unwinding of the fishing line can be detected by detecting the length of the unwound fishing line and the change amount thereof.

That is, the above-mentioned (2) is recognized when it is detected that the length of the unwound fishing line becomes longer (e.g., reaches a length equal to or longer than the length of the fishing rod+2 m) than a predetermined value (e.g., equal to or less than the length of the fishing rod+1 m). Thereafter, (3) is recognized when it is detected that the fishing line is wound in the winding direction after the maximum length of the fishing line is unwound. When the phenomena in (2) and (3) occur in succession, the fishing line is recognized to have been unwound. That point of time of each said phenomena is recorded. Since the spool rotation detector 192 can function as the detector 19 in this method, the detector 19 can be omitted.

Next, a case where the spinning reel 10B is used as the fishing reel 10 will be described. In the spinning reel 10B, it is difficult to detect the above (2) as the spool 11B does not rotate when the fishing line is unwound. However, the above (1) and (3) can be detected since the opening/closing status of a bale arm can be detected by the unwoundable state detector 194.

(1) is recognized when the unwoundable state detector 194 detects that the closed bale becomes open. The bale becomes open only during (2) under normal use. Therefore, (2) is recognized when the bale becomes open.

Thereafter, (3) is recognized when it is detected that the opened bale becomes closed. When the phenomena in (1) through (3) occur in succession, the fishing line is recognized to have been unwound. That point of time of each said phenomena is recorded.

Then, (4) through (5) are recognized when a winding operation is performed by the winding operation detector 193. When a bale becomes open and closed in succession without the occurrence of (4), only the most recent opening/closing of the bale may be recognized as the unwinding of a fishing line.

Next, a method for detecting the completion of the retrieval of a rig with the retrieval completion detector 162 will be described. In most cases, a user does not perform a winding operation during the period from the completion of the retrieval of the fishing line in (6) to the next unwinding of the fishing line in (3). Therefore, when it is detected that the unwinding of the fishing line has commenced, the time of the immediately preceding winding operation is the time of the completion of the retrieval. Recording this time makes it possible to detect the retrieval of the rig.

Another method for detecting the completion of the retrieval of a rig will be described. As in the case of the commencement of the unwinding described above, the retrieval of a rig can also be detected using the length of an unwound fishing line. That is, the above (5) is recognized to have moved on to the above (6) when it is detected that the length of the unwound fishing line becomes shorter (e.g., shortened to a length equal to or less than the length of the fishing rod+1 m) than a predetermined value (e.g., equal to or longer than the length of the fishing rod+2 m). That point of time of each said phenomena is recorded. Thereafter, (1) is recognized to have moved on to (2) when there is an increase in the length of the unwound fishing line again. As described above, detecting operations of the fishing reel 10 with the detector 19 and calculating the length of the unwound fishing line make it possible to detect the commencement of the unwinding and the completion of the retrieval of the fishing line.

Then, the retrieving/casting time and the unwinding interval can be calculated by storing the time of the commencement of the unwinding of a fishing line and the time of the completion of the retrieval of a rig. The retrieving/casting time is obtained by calculating the time difference between the completion of the retrieval of a rig and the commencement of the next unwinding. The unwinding interval can be obtained by calculating the time difference between the commencement of the most recent unwinding and the commencement of the immediately preceding unwinding. Measuring and displaying said retrieving/casting time and the unwinding interval makes it possible to obtain an index according to the skill level of fishermen.

The retrieving/casting time and the unwinding interval obtained by the means referred to above may be displayed immediately after calculation, or a history of said retrieving/casting time or the unwinding interval so obtained may be stored in the storage 17, the results of which may be displayed on a display.

Since this enables not only to display the retrieving/casting time and the unwinding interval immediately after measurement, but also to display the same after fishing or during a break, the history thereof may be calculated to display statistical values such as average, maximum, and minimum within a certain period of time (e.g., within one day or one month).

Figure 3:
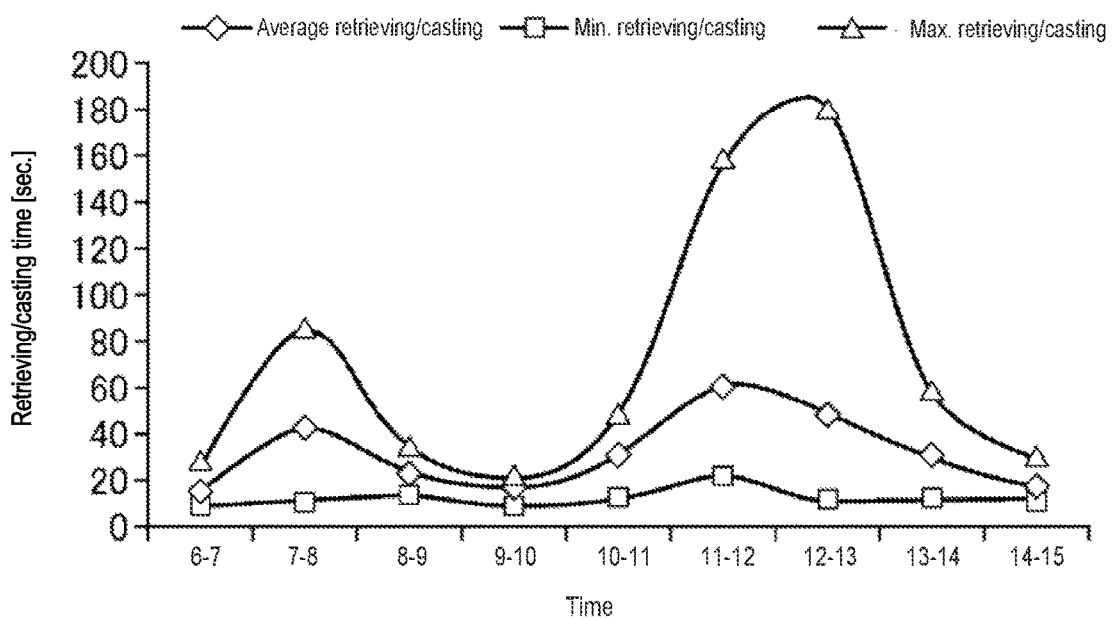
FIG. 3 is a diagram illustrating a display example of a display in the fishing reel 10 and the fishing information management system 100 according to an embodiment of the present disclosure.

Next, a method for displaying the history of the retrieving/casting time or the unwinding interval will be described in more detail with reference to FIGS. 3 and 4. First, FIG. 3 shows hourly changes in the average, minimum, and maximum of the retrieving/casting time. This enables a user to grasp the efficiency of the day's work and the relation with the catch of fish. Further, if the aggregation period is long, such as one month and one year, the user can understand the changes in his/her skill level.

Figure 4:
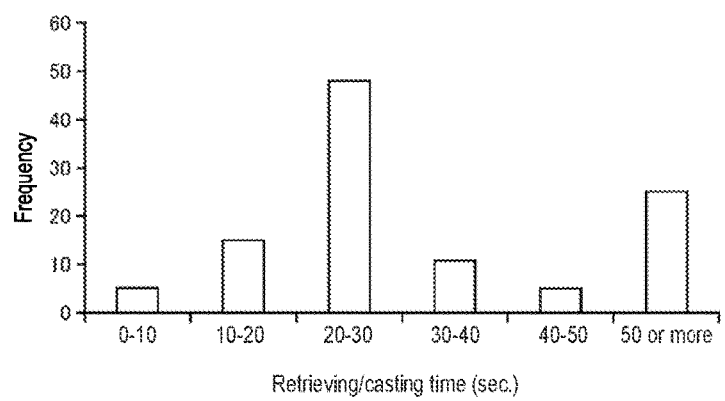
FIG. 4 is a diagram illustrating a display example of a display in the fishing reel 10 and the fishing information management system 100 according to an embodiment of the present disclosure.

FIG. 4 shows an example of histogram display of a day's retrieving/casting time. Since the retrieving/casting time may largely vary depending on the types of operations and the like, such as when nothing is done, when only a bait is replaced, when a rig is also replaced, when a fish caught is removed, when a fishing line is entangled, and when moving to another fishing spot, the entire picture may be made more easily understandable by displaying the retrieving/casing time in a histogram than by displaying average values only.

In this example, the statistics for the day as well as the histogram are displayed in the left column. The start time is the time when starting fishing, and can be obtained by, for example, detecting the time when a user performed the first operation on the day. The end time is the time when finishing fishing, and can be obtained by, for example, detecting the time when the user performed the last operation on the day. The actual fishing time is a time elapsed from the start time to the end time.

The number of times of casting is the number of times of detection of the commencement of the unwinding of a fishing line that is performed between the start time and the end time. The average unwinding interval is an average value of the unwinding interval calculated by the method described above. This is equal to a value obtained by dividing the actual fishing time by the number of times of casting. The average retrieving/casting time is an average value of the retrieving/casting time calculated by the method described above. The retrieving/casting time rate is a value obtained by dividing the total value of the retrieving/casting time of the day by the actual fishing time. This is equal to a value obtained by dividing the average retrieving/casting time by the average unwinding interval. In this example, the values are expressed in percentage.

Subtracting the retrieving/casting time rate from 100% equals to the percentage of time during which a rig stays in the water, which is the percentage of time during which fish may be caught. Therefore, it can be judged that the smaller the retrieving/casting time is, the more efficiently fishing is performed.

These values, such as average retrieving/casting time, average unwinding interval, and retrieving/casting time rate, correlate with the skill level and catch of fish for some fishing species. Therefore, calculating and displaying these values may provide a user with a guide for improving his/her skill, and may be useful to improve his/her motivation and satisfaction with fishing.

The dimensions, materials and arrangements of each component described herein are not limited to those explicitly described in the embodiments, and each component can be modified to have any dimension, material and arrangement that can be included within the scope of the present disclosure. Further, components that are not explicitly described herein may be added to the described embodiments, or some of the components described in each embodiment may also be omitted.

DESCRIPTION OF THE NUMERICAL REFERENCES

10 Fishing reel
11 Spool
12 Clutch
13 Drag device
14 Operation portion
15 Braking device
16 Calculator
17 Storage
19 Detector
31 Fishing line

The invention claimed is:

1. A fishing reel comprising:
a spool configured to wind a fishing line;
an operation portion configured to wind the fishing line;
a fishing line unwinding commencement detector configured to detect a commencement of an unwinding of the fishing line by the fishing reel;
an unwinding interval measuring portion configured to measure a time interval between the commencement of the unwinding of the fishing line and a commencement of a next unwinding of the fishing line; and
a communicator configured to communicate the measured time interval between the commencement of the unwinding of the fishing line and the commencement of the next unwinding of the fishing line.

2. A fishing information management system comprising:
the fishing reel according to claim 1; and
an external device comprising a display configured to display the time interval between the commencement of the unwinding of the fishing line and the commencement of the next unwinding of the fishing line, or a time interval from a retrieval of a rig to the commencement of the next unwinding of the fishing line.

3. The fishing information management system according to claim 2, wherein the display is configured to display statistical values regarding the time interval between the commencement of the unwinding of the fishing line and the commencement of the next unwinding of the fishing line, or the time interval from the retrieval of the rig to the commencement of the next unwinding of the fishing line.

4. The fishing information management system according to claim 2, wherein the external device is a smartphone, a wearable terminal, a notebook computer, or a fishing finder.

5. A fishing information management system comprising: the fishing reel according to claim 1; and
an external device comprising a storage configured to store the time interval between the commencement of the unwinding of the fishing line and the commencement of the next unwinding of the fishing line.

6. A fishing information management system comprising: the fishing reel according to claim 1; and
an external device comprising a calculator configured to calculate detection results regarding the commencement of the unwinding of the fishing line.

7. A fishing reel comprising:
a spool configured to wind a fishing line at one end of which a rig is attached;
an operation portion configured to wind the fishing line;
a fishing line unwinding commencement detector that detects configured to detect a commencement of an unwinding of the fishing line by the fishing reel;
a retrieval completion detector configured to detect a retrieval of the rig;
a retrieving/casting time measuring portion configured to measure a time interval from the retrieval of the rig to a commencement of a next unwinding of the fishing line; and
a communicator configured to communicate the measured time interval from the retrieval of the rig to the commencement of the next unwinding of the fishing line.

* * * * *